United States Patent
Saito et al.

(10) Patent No.: US 9,530,078 B2
(45) Date of Patent: Dec. 27, 2016

(54) PERSON RECOGNITION APPARATUS AND PERSON RECOGNITION METHOD

(71) Applicant: Kabushiki Kaisha Toshiba, Tokyo (JP)

(72) Inventors: Hiroo Saito, Tokyo (JP); Hiroshi Sukegawa, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 175 days.

(21) Appl. No.: 14/200,270

(22) Filed: Mar. 7, 2014

(65) Prior Publication Data

US 2014/0270370 A1 Sep. 18, 2014

(30) Foreign Application Priority Data

Mar. 18, 2013 (JP) ................................. 2013-055377

(51) Int. Cl.
G06K 9/00 (2006.01)
G06K 9/62 (2006.01)

(52) U.S. Cl.
CPC ......... *G06K 9/6253* (2013.01); *G06K 9/00288* (2013.01); *G06K 9/00617* (2013.01)

(58) Field of Classification Search
CPC .................. G06K 9/00288; G06K 2009/00328
See application file for complete search history.

(56) References Cited

U.S. PATENT DOCUMENTS

| | | | | |
|---|---|---|---|---|
| 2005/0117783 A1* | 6/2005 | Sung | .................. | G06K 9/00288 382/118 |
| 2009/0316962 A1* | 12/2009 | Sun | ..................... | G06K 9/00248 382/118 |
| 2010/0177206 A1* | 7/2010 | Ogawa | ............... | G06K 9/00275 348/222.1 |
| 2011/0091113 A1* | 4/2011 | Ito | ...................... | G06K 9/00248 382/197 |
| 2012/0308090 A1* | 12/2012 | Sukegawa | .......... | G06K 9/00288 382/118 |

FOREIGN PATENT DOCUMENTS

JP 2011-048668 A 3/2011

\* cited by examiner

*Primary Examiner* — Bhavesh Mehta
*Assistant Examiner* — Ian Lemieux
(74) *Attorney, Agent, or Firm* — Baker Botts L.L.P.

(57) ABSTRACT

A person recognition apparatus is disclosed that includes an image input unit, a face detection unit in which a face is expressed from the inputted image data, as a score which takes a value in accordance with facial likeness, a facial feature point detection unit, a feature extraction unit, a feature data administrative unit, a person identification unit to calculate similarity between the amount calculated by the feature extraction unit and the amount stored in the feature data administrative unit, a number of candidates calculation unit which displays the images stored in descending order of the similarity, and calculates a score from the face detection unit and the facial feature point detection unit, a candidate confirmation unit in which images displayed in descending order of the similarity are subjected to visual inspection.

7 Claims, 7 Drawing Sheets

PERSON RECOGNITION APPARATUS AND PERSON RECOGNITION METHOD

CROSS-REFERENCE TO RELATED APPLICATION

This application is based upon and claims the benefit of priority from Japanese Patent Application No. 2013-055377, filed on Mar. 18, 2013; the entire contents of which are incorporated herein by reference.

FIELD

Embodiments described herein relate generally to a person recognition apparatus and a person recognition method.

BACKGROUND

Conventionally, technology to recognize a person from a face area of a person included in moving image data imaged by a monitoring camera and so on, based on the feature information of facial images previously stored, and to retrieve a facial image of a specific person has been proposed. In this case, feature information is extracted from a face area included in the moving image data, and a facial image having a high index (similarity) indicating the similarity between the extracted feature information and the feature information previously stored is retrieved out of the facial images previously stored, and is outputted.

However, in the above-described technology, it has been difficult to understand up to what facial images are to be confirmed, out of the facial images which have been retrieved as facial images having high similarity. For example, when the condition such as a face direction of a person imaged by a monitoring camera is disadvantageous for collation with the previously stored feature information, a facial image of a person different from the imaged person may be outputted as the result of a higher rank, and a facial image which is to be essentially retrieved may become a lower rank. Accordingly, it is made easy to understand up to what facial images are to be confirmed, out of the facial images which have been retrieved, and thereby overlooking can be prevented

DETAILED DESCRIPTION

Figure 1:
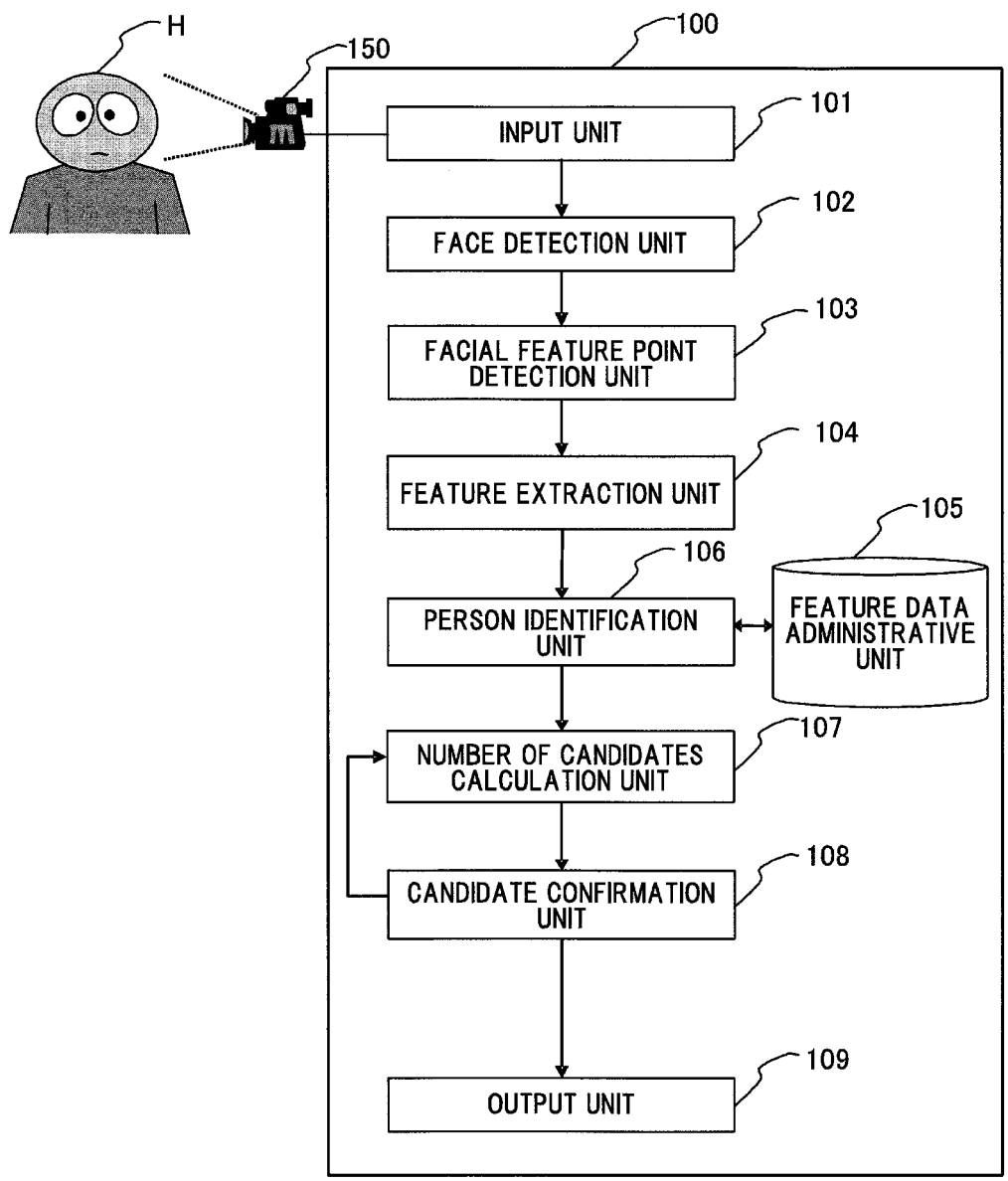
FIG. 1 is a block diagram to exemplify a configuration of a person recognition apparatus according to an embodiment.

According to one embodiment, there is provided a person recognition apparatus including: an input unit to input image data; a face detection unit to detect a face area in which a face of a person is expressed from the inputted image data, and to output a score which takes a large value in accordance with facial likeness; a facial feature point detection unit to detect an angle of a face direction from a feature point of the detected face area; a feature extraction unit to calculate a first feature amount for personal identification from the feature point detected by the facial feature point detecting unit; a feature data administrative unit to store a second feature amount of each person including information indicating a feature of a face of the relevant person, for each person; a person identification unit to calculate a similarity between the first feature amount calculated by the feature extraction unit and the second feature amount stored in the feature data administrative unit; a number of candidates calculation unit which displays the facial images stored in the feature data administrative unit in descending order of the similarity calculated by the person identification unit, and calculates a number of facial images to be displayed in accordance with the score outputted from the face detection unit and the angle of the face direction outputted from the facial feature point detection unit; a candidate confirmation unit in which retrieval candidates of the facial images displayed in descending order of the similarity are subjected to visual inspection, and which calculates again the number of the facial images displayed by the number of candidates calculation unit in accordance with increase or decrease of the number of candidates to be confirmed; and an output unit to output whether or not the image data inputted by the input unit has been stored in the feature data administrative unit, as a result of the confirmation of the candidate confirmation unit.

Further, according to one embodiment, there is provided a person recognition method including: inputting image data; detecting a face area in which a face of a person is expressed from the inputted image data, and outputting a score which takes a large value in accordance with facial likeness; detecting an angle of a face direction from a feature point of the detected face area; calculating a first feature amount for personal identification from the detected feature point; storing a second feature amount of each person including information indicating a feature of a face of the relevant person, for each person, in a feature data administrative unit; calculating a similarity between the first feature amount and the second feature amount stored in the feature data administrative unit; displaying the facial images stored in the feature data administrative unit in descending order of the calculated similarity, and calculating a number of facial images to be displayed in accordance with the outputted score and the outputted angle of the face direction; retrieval candidates of the facial images displayed in descending order of the similarity are subjected to visual inspection, and calculating again the number of the facial images to be displayed in accordance with increase or decrease of the number of candidates to be confirmed; and outputting whether or not the inputted image data has been stored in the feature data administrative unit, as a result of the visual inspection.

Hereinafter, a person recognition apparatus and a method of an embodiment will be described in detail with reference to the attached drawings. The person recognition apparatus and the method of the embodiment suppose a system which retrieves a person projected in an image of a security camera (hereinafter, a camera) installed at a street, building, public area and so on, with reference to information indicating the feature of a face of each of persons previously stored. In addition, in the embodiment described below, inputting an image from a camera is exemplified, but it goes without saying that an image read out by a scanner or the like may be inputted.

In addition, in the present embodiment, a process to detect a face area of a person and use the feature information of a face, to thereby realize the problem will be described, but technology to discriminate a person using an image area except for a face, by utilizing publicly known technology to detect also an entire body area except for a face may be used, without being limited to the technology described in the present embodiment.

FIG. 1 is a block diagram to exemplify a configuration of a person recognition apparatus 100 according to an embodiment. As shown in FIG. 1, the person recognition apparatus 100 is provided with an input unit 101, a face detection unit 102, a facial feature point detection unit 103, a feature extraction unit 104, a feature data administrative unit 105, a person identification unit 106, a number of candidates calculation unit 107, a candidate confirmation unit 108, and an output unit 109. In addition, the person recognition apparatus 100 performs recognition of a person H, based on a moving image imaged by a camera 150.

The camera 150 performs photographing of a prescribed area. For example, the camera 100 is a monitoring camera or the like to perform photographing of an entrance/exit object area of a passage, and generates moving image data that is the photographing result. And the input unit 101 performs input processing of the moving image data from the camera 150.

The camera 150 can be installed at at least one position, or at a plurality of points. In addition, the camera 150 inputs a facial image of a person who is present in a prescribed area, and is an ITV (Industrial Television) camera, for example. The camera 150 digitalizes optical information obtained through an optical lens by an A/D converter, to generate frame image data of a prescribed frame rate, and outputs it to the person recognition apparatus 100. In addition, since image data of a person that becomes a retrieval object has only to be inputted into the person recognition apparatus 100 as digital image data as a result, an image file and a moving image file photographed by a digital still camera may be taken in through a storage medium such as a USB (Universal Serial Bus).

The face detection unit 102 detects a face area indicating a face of a human from the image data inputted from the input unit 101. Specifically, the face detection unit 102 obtains coordinates indicating an area of a face using brightness information on the image within the inputted image. Here, since the detection is realized using a publicly known method of Joint Haar-like feature based on co-occurrence suitable for face detection, it is presupposed to use the present method. The facial image is segmented from the inputted image, to perform personal identification. At this time, it is possible to output a score which takes a large value in accordance with facial likeness of the image. The area of the image with a high score is detected as a face.

In addition, information indicating the result detected by a direction and size of a face may be of an optional shape, but, in the present embodiment, a face area is shown by rectangular information, for simplification, and the coordinates of its corners are used as a detection result. In addition, the detection can be realized by a method which determines a position to give the highest correlation value as a face area, by obtaining a correlation value while a previously prepared template is moved within an image, and a face extraction method using an inherent space method, a subspace method, and so on.

In addition, in the case of a moving image imaged by the camera 150, it is supposed that the detected faces of the same person are continuously shown across a plurality of frames, it is necessary to perform tracking processing of a face of a person so that they are correlated with the same person. This tracking processing can be realized using a method which correlates a detected face using an optical flow with at what position the face is present in the next frame, and in the feature extraction unit 104 described later, a method to select at least one appropriate image suitable for retrieving out of the images of face areas of a plurality of frames which are correlated with the same person may be used, or it becomes possible to use the images of an optional number up to the number of detected frames.

In addition, the facial feature point detection unit 103 detects positions of face portions such as eyes and a nose, out of the portions of the detected face area, as feature points of a face. Specifically, the detection can be realized by a publicly known method such as facial feature point extraction by the combination of shape extraction and pattern collation. In addition, the detection of a mouth area, except for the above-described detections of eyes and a nose, can easily be realized by using publicly known technology of a digital make system based on high precision facial feature point detection. In any cases, information which can be treated as a two-dimensional array image is acquired, and an area of a facial feature can be detected from it. In addition, regarding these processings, in order to extract only one facial feature from one image, correlation values with a template for the whole images are obtained, and the position and size where the correlation value becomes maximum may be outputted, and in order to extract a plurality of facial features, a local maximum value of correlation values for the whole images is obtained, a face candidate position is narrowed down in consideration of the overlapping within one image, and finally, in consideration of the relationship (time-based transition) with the past images which have been inputted continuously, and thereby it becomes possible to simultaneously detect a plurality of facial features finally.

Regarding the estimation of a face direction, a face direction can be estimated using a rotation matrix of a face, or a plurality of classes (subspaces) which have been studied for the respective face directions.

Figure 2:
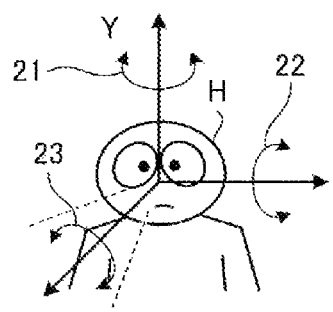
FIG. 2 is a conceptual diagram to exemplify a face direction of a person.

FIG. 2 is a conceptual diagram to exemplify a face direction of the person H. To begin with, regarding a face direction, as shown in FIG. 2, a yaw direction (a horizontal direction) 21, a pitch direction (an up-and-down direction) 22, a roll direction (a rotational direction) 23 are respectively determined as $\theta$, $\phi$, $\Psi$ [radian]. In the estimation of a face direction, these values of $\theta$, $\phi$, $\Psi$ are to be obtained.

The feature extraction unit 104 normalizes the facial image, using the information of the feature points detected by the facial feature point detection unit 103, so that the facial image becomes in a definite condition regarding a tilt and size thereof. And, the feature extraction unit 104 calculates facial feature information indicating individuality of a face using the normalized image.

In addition, as described in the description of the face detection, in the case of the walking of one person, it is possible to obtain facial images of a plurality of frames which are correlated with the same person. In order to calculate similarity between the feature points of the faces, using one frame or a plurality of frames from a plurality of facial images, at the time of selecting images, generally, whether or not the person is a registered person is discriminated, by selecting with priority images whose similarity is easy to become high.

As an index in which the similarity is easy to become high, there is a method to select an index based on indexes, such as, that a face direction is in a state facing approximately front, that a face is reflected large, to be in an approximately expressionless state, not to be in a state of eye closure or side glance, that there is nothing to conceal a face, and that shadow of a face is not present. Regarding the estimation of a face direction, it is possible to estimate face direction using a rotation matrix of a face, a plurality of classes (subspaces) which have been studied for the respective face directions. Since the angle of a face is found by this means, it is possible to estimate whether or not an angle is present such that a part of the facial feature cannot be seen. Regarding a size of a face, the size of the detected facial image can be used as an index without change. Regarding the discrimination of an expression, eye closure, side glance, presence or absence of concealment of a face, presence or absence of a shadow, a lot of the relevant images are respectively collected, the images are sorted based on whether or not the images are in an ideal state, to form an average image of the relevant class, and an average image of the non-relevant class, and thereby the discrimination thereof can be made by calculating the correlation value regarding to which the inputted image is near, and thereby the discrimination can be made, or the description thereof can be made using discrimination technology such as a Support Vector Machine. It is possible to select a frame suitable for collation with priority by performing weight-adding of these indexes, for example. In addition, similarities between the facial images in the all frames and the registered facial feature information of the relevant person have previously been obtained, and weight is calculated as to what indexes affect the similarities, by obtaining a coefficient of an expression of a weighted linear sum by linear regression, and thereby it becomes possible to select an appropriate frame with higher precision.

A method to detect a point such as eyes and a nose of a face as a facial feature point can be realized by a publicly known method such as facial feature point extraction by the combination of shape extraction and pattern collation. In addition, as a processing to normalize a facial image based on a facial feature point, a method to form an image in which a direction and a state of a face are intentionally changed using an average three-dimensional model of a face, to thereby form an image in which a direction of a face is corrected in an optional direction, may be applied. In this case, it becomes possible to raise the precision of the normalization, not by the above-described publicly known method, but by increasing the number of facial feature points to be detected.

As a method to extract facial feature information indicating a feature of an individual from the normalized image, it becomes possible to obtain facial feature information, by forming an image in which a direction and a state of a face is intentionally changed using a model, for the information of a person image of one sheet. On the other hand, it is also possible to execute recognition processing with higher precision, by performing calculation by a moving image using a plurality of continuous images for the same person. Specifically, the description will be made with a method using a mutual subspace method.

Images with (m×n) pixels are segmented from images (frames) continuously obtained from the input unit 101, a correlation matrix of feature vectors of these data is obtained, and normal orthogonal vectors by K-L transform are obtained, and thereby a subspace indicating the feature of a face obtained from the continuous images is calculated. Regarding a calculation method of the subspace, a correlation matrix (or a covariance matrix) of the feature vectors is obtained, normal orthogonal vectors (eigenvectors) by K-L transform are obtained, and thereby the subspace is calculated. Eigenvectors corresponding to eigenvalues are selected by K pieces in descending order of the eigenvalue, and the subspace is expressed using its eigenvector set. In the present embodiment, a correlation matrix Cd is obtained from the feature vectors, and the correlation matrix Cd is diagonalized as Cd=Φd Λd Φd T, to obtain a matrix Φ of an eigenvector. This information becomes a subspace indicating the feature of a face of a person who is a recognition object at present. The feature information such as a subspace outputted by the method like this is made feature information of an individual for a face detected in the inputted images.

The feature data administrative unit 105 stores person information including information indicating the feature of a face of a person, for each person. Specifically, the feature data administrative unit 105 is a data base that becomes an object which the person identification unit 106 uses when calculating similarity, and administers facial feature information indicating a facial feature, for each person to become a retrieval object. It is possible to administer a facial image and information associated with the relevant person, such as a name, sexuality, age, height, in correlation with each facial feature information, so that a user can easily understand the result. The content to be actually administered as the facial feature information may be the data itself outputted by the feature extraction unit 104, and may be the feature vectors of (m×n), the subspace, or the correlation matrix immediately before performing KL transform.

The person identification unit 106, extracts (retrieves) persons in descending order of the similarity between the features of the faces of the persons stored in the feature data administrative unit 105 and the feature points of a face detected by the feature extraction unit 104, based on the information stored in the feature data administrative unit 105. Specifically, the person identification unit 106 performs the calculation of the similarity between the facial feature information of the input image obtained by the feature extraction unit 104 and the corresponding facial feature information stored in the feature data administrative unit 105, and outputs the result to the output unit 109 in descending order of the similarity.

The person identification unit 106, as a result of this retrieval processing, outputs personal IDs which are administered so as to identify persons in the feature data administrative unit 105, and the similarities that are the calculation result, in descending order of the similarity. The person identification unit 106 may output together, in addition to it, information administered for respective persons in the feature data administrative unit 105, but since basically the correlation can be made by the personal ID, it becomes possible to realize the retrieval processing itself without transferring the attached information.

The similarity is made a value indicating the similarity between the subspaces which are administered as the facial feature information. As its calculation method, a method such as a subspace method, or a complex similarity method may be used. In this method, data indicating the facial features previously stored in the feature data administrative unit 105, and the data inputted from the feature extraction unit 104 are expressed as subspaces calculated from a plurality of images, and "an angle" formed by the two subspaces is defined as the similarity. Here, the subspace to be inputted is called an input means subspace.

The person identification unit 106 similarly obtains a correlation matrix Cin for input data strings, and the correlation matrix Cin is diagonalized as Cin=Φin Λin Φin T, to obtain an eigenvector Φin. A similarity between subspaces (0.0 to 1.0) of the subspaces expressed by the two Φin, Φd is obtained, and this is made a similarity for recognition. The specific calculation method can be realized by the above-described publicly known method. In addition, whether or not a person in question is the person himself is discriminated, by projecting collectively a plurality of person images from which the same person can be identified to the subspace in advance, and thereby it is possible to improve the precision. In addition, as a similarity index except the similarity, it is apparent that a distance on the feature space and a distance such as a Mahalanobis distance can be used. In case that a distance is used, since the larger the value is, the lower the similarity becomes, as a method to compare with a threshold value, it is shown that the smaller than the threshold value the value is, the higher the similarity with the person stored in the feature data administrative unit 105 is.

The output unit 109 displays the facial images included in the feature data administrative unit 105 in descending order of the similarity calculated by the person identification unit 106. At this time, the number of candidates calculation unit 107 controls the number of facial images to be displayed in accordance with the scores and the angles obtained from the face detection unit 102 and the facial feature point detection unit 103. When a score expressing facial likeness is low by the effect of the image quality, or when a part of a face is concealed since the angle is large, since the similarity might drop, the number of candidates to be confirmed is increased, to thereby not miss the candidate. The number of candidates calculation unit 107 calculates the number of candidates who are made a candidate from a higher rank of the persons extracted by the person identification unit 106 in descending order of the similarity, based on the imaging condition of the face area detected by the face detection unit 102. Here, the number of candidates is "c", and its initial value is "n". When the imaging condition of a face area contained in the image inputted from the camera 150 is disadvantageous to the retrieval processing of the person identification unit 106, a person himself similarity becomes lower in the case of comparison with the feature point of the person himself, and in many cases, the distribution of the person himself similarity overlaps with the distribution of an another person similarity in the case of comparison with the feature point of another person.

Figure 3:
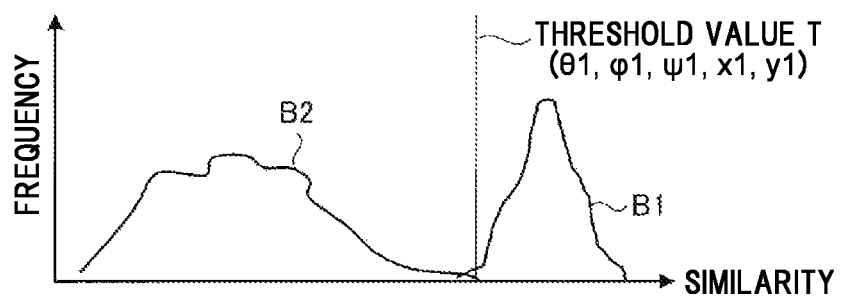
FIG. 3 is a diagram to exemplify frequency distributions of a person himself similarity and another person similarity.
Figure 4:
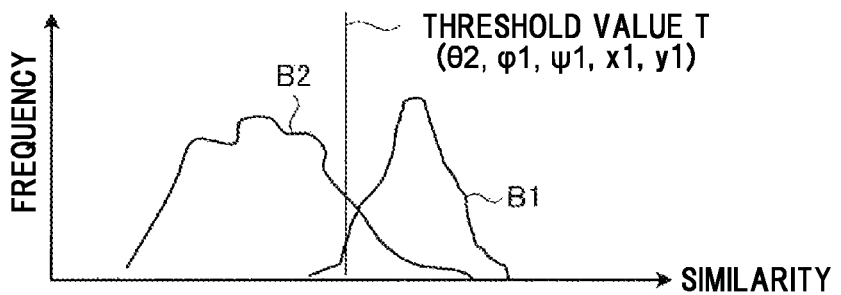
FIG. 4 is a diagram to exemplify frequency distributions of a person himself similarity and another person similarity.

FIG. 3, FIG. 4 are diagrams each to exemplify frequency distributions of a person himself similarity and an another person similarity. Here, a graph B1 shows a frequency distribution of the person himself similarity, and a graph B2 shows a frequency distribution of the another person similarity. In addition, it is assumed that the photographing condition of FIG. 4 is worse than the photographing condition of FIG. 3. As is apparent from the comparison between FIG. 3 and FIG. 4, when the photographing condition is disadvantageous to the retrieval processing of the person identification unit 106, the overlapping portion of the graph B1 and the graph B2 becomes large.

Here, as evaluation indexes to reflect the photographing condition, there are a face direction in a face area, a score at the time of face detection, a resolution of a face, and so on. The face detection unit 102 can output a score which takes a large value in accordance with facial likeness of an image. An area of an image with a high score is detected as a face. Inside the face detection unit 102, a function is used which outputs a large value in the case of a face, and outputs a small value in the case of not a face, based on the brightness value of each pixel of an input image. In addition, if a lot of image data is prepared in which that the image is (not) of a face is known, the function like this can be obtained by a statistical method. Regarding a face direction, the features of faces of the persons stored in the feature data administrative unit 105 face a front direction, a face facing a front direction to the camera 150 becomes the photographing condition suitable for collation. In addition, regarding a resolution of a face, a case in which the resolution of a face is high (the number of pixels of a face area is many) becomes the photographing condition suitable for collation. Accordingly, the number of candidates calculation unit 107 calculates more the number of candidates c in accordance with the case in which a face direction separates from a front direction, or the resolution of a face decreases, and calculates less the number of candidates c in accordance with the case in which a face direction becomes a front direction, or the resolution of a face increases. Specifically, the number of candidates calculation unit 107 adaptively determines a threshold value relating to the calculation of the number of candidates c for each input, based on the value of the imaging condition (such as a face direction, a resolution of a face) of a face area detected by the face detection unit 102. In addition, the following procedure can similarly be applied to other image feature amounts having correlation with the similarity.

To begin with, regarding the face direction of the person H, as shown in FIG. 2, the yaw direction (horizontal direction) 21, the pitch direction (up-and-down direction) 22, the roll direction (rotational direction) 23 are respectively determined as θ, φ, Ψ [radian]. And, the sizes of a face which the face detection unit 102 outputs are respectively determined as x, y [pixels] in the longitudinal direction and in the lateral direction. At this time, when a face direction is large (for example, when a face direction separates from a front direction), and when the size of a face is small (when a resolution becomes low), the similarity may sometimes be decreased. Data is previously prepared in which face directions and sizes are normalized to the respective facial images stored in the feature data administrative unit 105, so that θ=θ1, θ2, . . . , θN, φ=φ1, φ2, . . . , φN, Ψ=Ψ1, Ψ2, . . . , ΨN, (x, y)=(x1, y1), . . . , (xN, yN). The number of candidates calculation unit 107 obtains frequency distributions of a person himself similarity and an another person similarity when they are inputted, and determines a threshold value T(θ, φ, Ψ, x, y) for each of these parameters. In the case of FIG. 3, for example, the threshold value T(θ1, φ10 Ψ1, x1, y1) is determined when θ=θ1, φ=φ1, Ψ=Ψ1, (x, Y)=(x1, y1).

The threshold value T(θ, φ, Ψ, x, y) can be determined by designating a ratio of the data in which the similarity exceeds the threshold value T(θ, φ, Ψ, x, y). In the retrieval processing, parameters (θ, φ, Ψ, x, y) are calculated regarding the inputted facial image, to obtain the threshold value T(θ, φ, Ψ, x, y). The threshold value T(θ, φ, Ψ, x, y) may be made a hash regarding each of θ=θ1, θ2, . . . , θN, φ=φ1, φ2, . . . , φN, Ψ=Ψ1, Ψ2, . . . , ΨN, (x, y)=(x1, y1), . . . , (xN, yN), regarding the parameters (θ, φ, Ψ, x, y). In addition, the threshold value T(θ, φ, Ψ, x, y) may be made a function calculated with regression analysis by a linear model as shown in the following expression (1).

$$T(\theta,\phi,\Psi,x,y)=a1\theta+a2\phi+a3\Psi+a4x+a5y+b \qquad (1)$$

Using this threshold value T(θ, φ, Ψ, x, y), the number of confirmation candidates c=n(θ, φ, Ψ, s, x, y) is obtained as follows.

n(θ, φ, Ψ, s, x, y)=n (when the number of persons with the similarity exceeding threshold value T(θ, φ, Ψ, x, y) is not more than the predetermined value n)

n(θ, φ, Ψ, s, x, y)=the number of persons with the similarity exceeding the threshold value T(θ, φ, Ψ, x, y) (the case other than it)

In the candidate confirmation unit 108, the retrieval candidates of the facial images displayed in descending order of the similarity are checked with eyes. In the case of increasing or decreasing the number of the candidates to be confirmed, the processing returns to the number of candidates calculation unit 107, to make the retrieval candidates to be outputted again.

Figure 5:
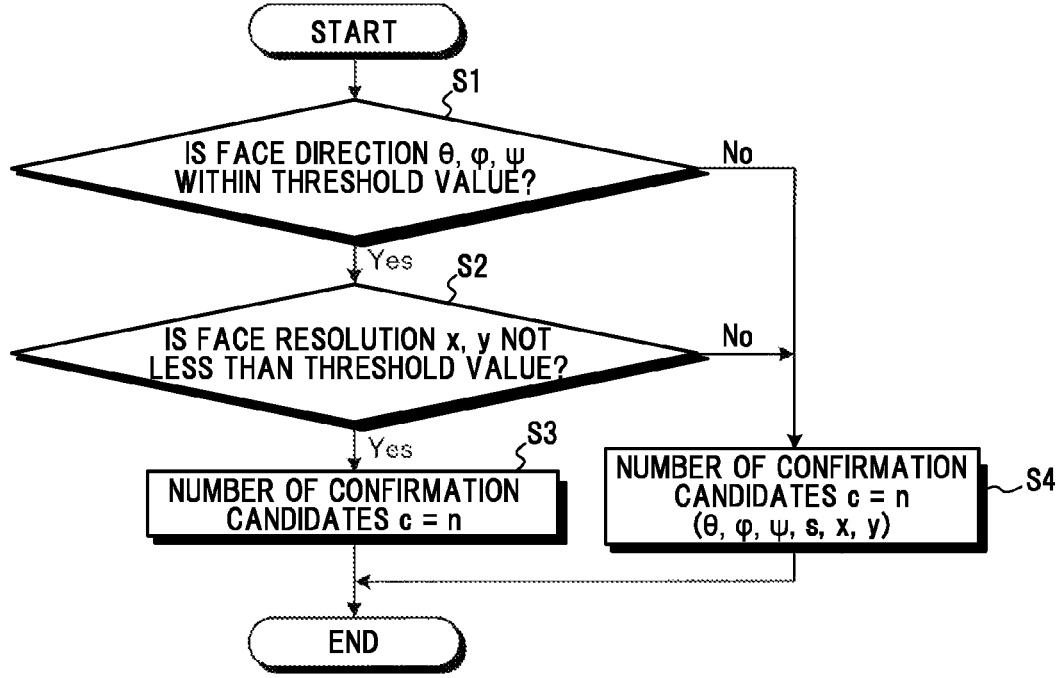
FIG. 5 is a flow chart to exemplify a processing of calculating the number of candidates.

FIG. 5 is a flow chart to exemplify a calculation processing of the number of candidates, and a flow chart showing a processing to obtain the above-described number of confirmation candidates c=n(θ, φ, Ψ, s, x, y). As shown in FIG. 5, when the processing is started, the number of candidates calculation unit 107 determines whether or not each of θ, φ, Ψ indicating a face direction is within a predetermined threshold value (for example, a direction facing front) (S1). In addition, when each of θ, φ, Ψ indicating the face direction is within the predetermined threshold value (S1: YES), the number of candidates calculation unit 107 determines whether or not the resolution (x, y) of a face is not less than a predetermined threshold value (S2).

When each of θ, φ, Ψ indicating the face direction is not within the predetermined threshold value (S1: NO), or when the resolution of the face is less than the predetermined threshold value (S2: NO), as shown in FIG. 4, other persons with the similarity exceeding the threshold value T become large, and since the number thereof is more than n, the number of candidates calculation unit 107 determines the number of candidates c=n(θ, φ, Ψ, s, x, y) as (the number of persons with the similarity exceeding the threshold value T(θ, φ, Ψ, x, y))(S4).

When each of θ, φ, Ψ indicating the face direction is within the predetermined threshold value (S1: YES), and the resolution of the face is not less than the predetermined threshold value (S2: YES), as shown in FIG. 3, the number of other persons with the similarity exceeding the threshold value T(θ, φ, Ψ, x, y) become small, and since the number thereof is not more than n, the number of candidates calculation unit 107 determines the number of candidates c=n (S3).

Figure 6:
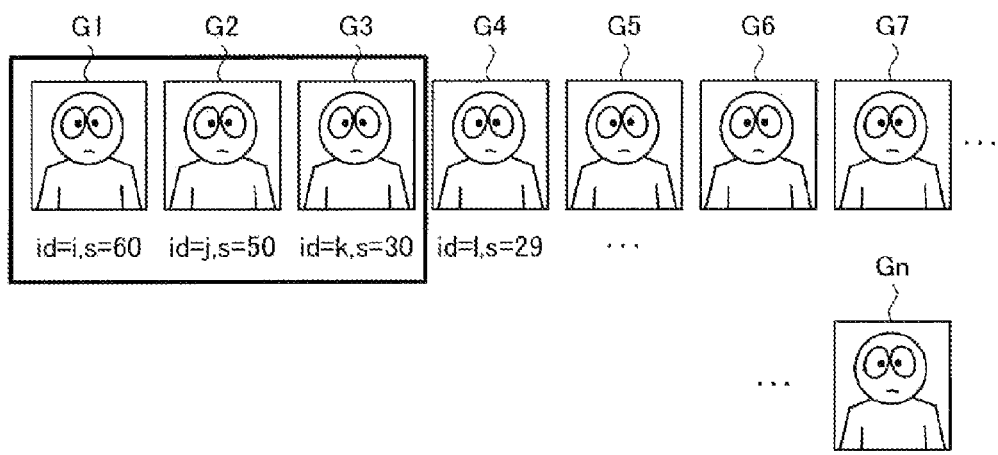
FIG. 6 is a conceptual diagram to exemplify facial images arranged in descending order of the similarity.

FIG. 6 is a diagram to exemplify facial images G1 to Gn arranged in descending order of the similarity. As shown in FIG. 6, when the facial images G1 to Gn are obtained in descending order of the similarity (s), persons of the number of candidates (c=3) calculated by the number of candidates calculation unit 107 from the higher rank are made persons to be confirmed. After the candidate confirmation unit 108 performs the visual inspection of the retrieval candidates of the facial images, from the higher rank of the persons extracted by the person identification unit 106 in descending order of the similarity, based on the number of candidates (c) calculated by the number of candidates calculation unit 107, the output unit 109 outputs information of persons of the number corresponding to the number of the candidates. Specifically, the output unit 109 displays the result obtained by the number of candidates calculation unit 107 on a screen, or stores it in a storage medium such as a USB memory. The output unit 109 also displays a warning, or displays a message to a guard.

Figure 7:
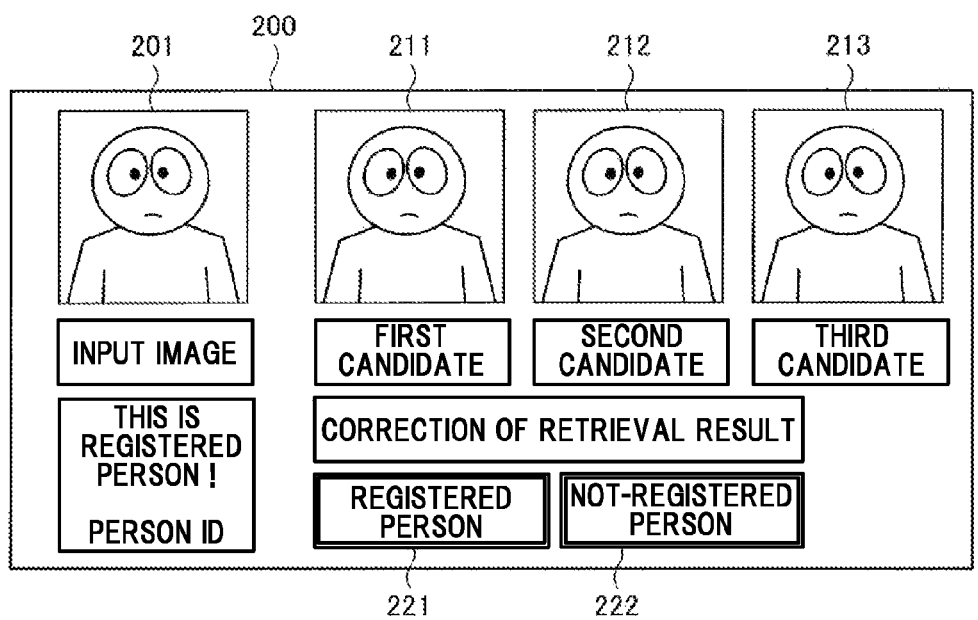
FIG. 7 is a conceptual diagram to exemplify a displaying screen.
Figure 8:
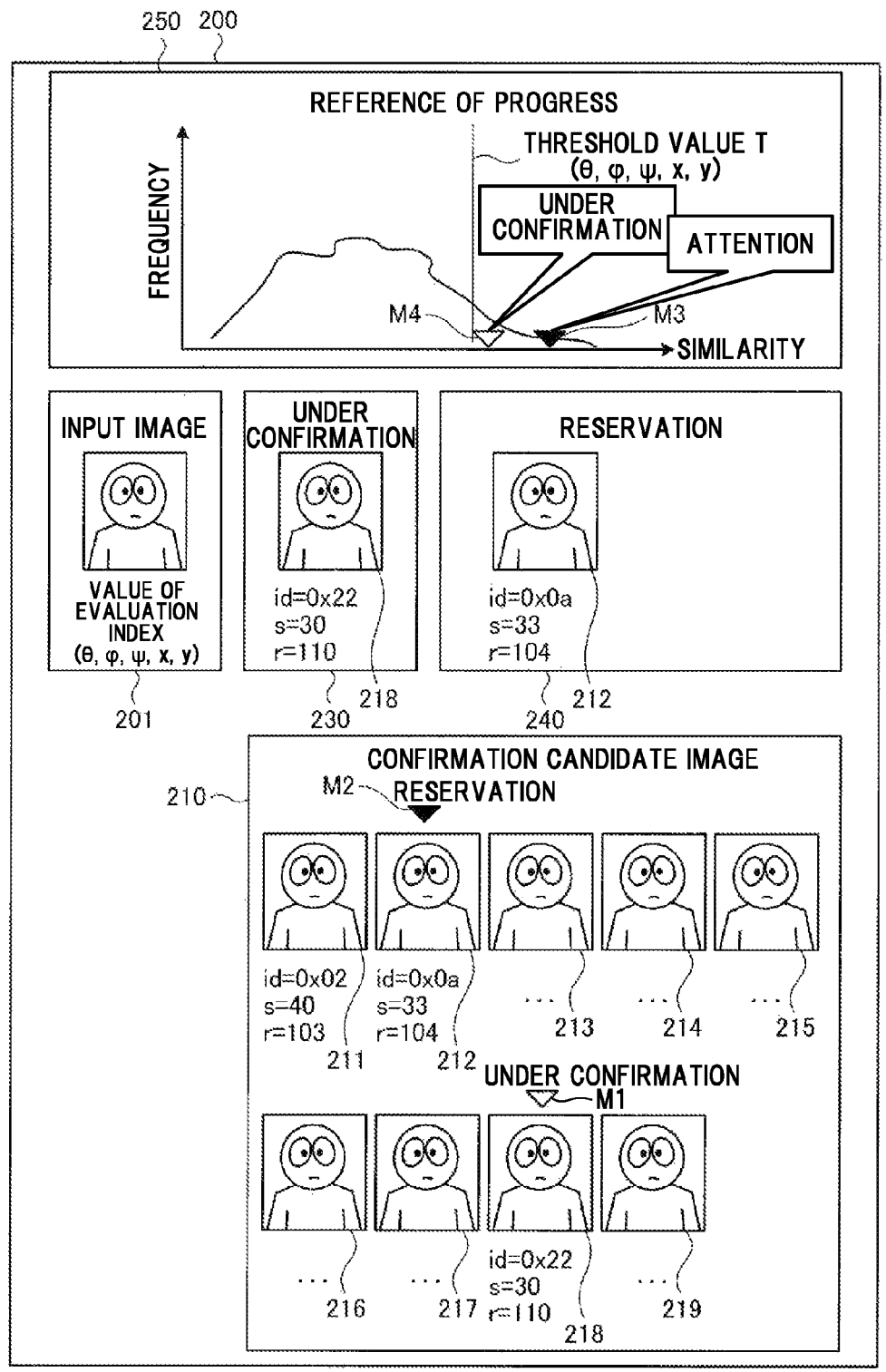
FIG. 8 is a conceptual diagram to exemplify a displaying screen.
Figure 9:
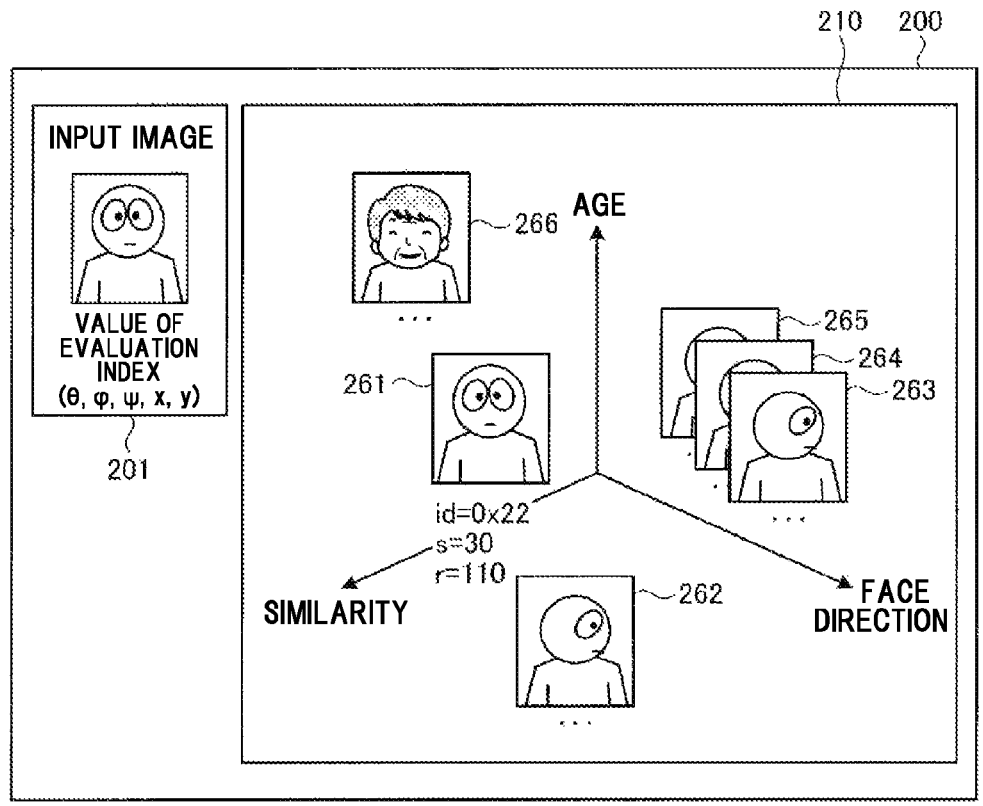
FIG. 9 is a conceptual diagram to exemplify a displaying screen.

FIG. 7 to FIG. 9 are conceptual diagrams each to exemplify a displaying screen 200. As shown in FIG. 7, the output unit 109 displays an input image (an image is preferable in which a portion around a face area is segmented by the face detection unit 102) 201, and candidate images 211 to 213 that are facial images of persons of the number of candidates calculated by the number of candidates calculation unit 107, from the higher rank of the persons extracted by the person identification unit 106 in descending order of the similarity, on the displaying screen 200. For this reason, in the displaying screen 200, it becomes easy to understand up to what images are to be confirmed from the facial images of the persons extracted in descending order of the similarity. And, a user can perform setting and so on to the facial image confirmed by operating buttons 221, 222 and so on of the displaying screen 200.

In addition, as shown in FIG. 8, the displaying screen 200 may have a confirmation display area 230, a reserved image display area 240, a progress data display area 250, in addition to a candidate image display area 210 to display the input image 201, and candidate images 211 to 219 of the persons of the number of candidates calculated by the number of candidates calculation unit 107, from the higher rank of the persons extracted by the person identification unit 106 in descending order of the similarity. The confirmation display area 230 is an area to display the candidate image 218 selected out of the candidate images 211 to 219 by an operation of a mark image M1 that is a pointer, and is arranged at a position lined with the input image 201. For this reason, a user selects a desired candidate image out of the candidate images 211 to 219 by the operation of the mark image M1, and thereby can compare the selected candidate image and the input image 201 side by side.

The reserved image display area 240 is an area to display the candidate image 212 showing a mark image M2 for reservation out of the candidate images 211 to 219. A user selects a desired candidate image out of the candidate images 211 to 219 by the operation of the mark image M1, and performs an instruct operation for reservation, and thereby can reserve the candidate image.

The progress data display area 250 is an area to display a progress state of the candidate which is under confirmation out of the candidate images 211 to 219 displayed in the candidate image display area 210. Specifically, in the progress data display area 250, out of the candidate images 211 to 219 with the similarity not less than the threshold value T, a mark image M4 indicating the position of the candidate image 218 which is selected by the mark image M1 and is under confirmation, and a mark image M3 indicating the position of the candidate image 212 which is indicated by the mark image M2 and is under reservation are displayed. A user confirms the display of the progress data display area 250, and thereby can grasp the progress state of confirming operation.

In addition, as shown in FIG. 9, candidate images 261 to 266 in the candidate image display area 210 may be displayed not only in descending order of the similarity, but may be displayed side by side along ranks such as a face direction, and an age. Here, regarding a face direction, the output unit 109 makes the candidate images 263 to 265 to be displayed side by side in the order from a face facing right to a face facing left, for example, based on the values calculated as θ, φ, Ψ. In addition, regarding an age, the output unit 109 makes the candidate images 261 to 266 to be displayed side by side in the order of age, using a publicly known technology of age analysis. By this means, a user can confirm the candidate images 261 to 266 which are arranged along the ranks such as a face direction, and an age.

In addition, the output unit 109 accepts an input of a distribution number so as to distribute the information to the number of confirmers to perform confirmation, based on an operation input of an input device such as a keyboard, and the output unit 109 may distribute the information of the persons of the number corresponding to the number of candidates, from the higher rank of the persons extracted by the person identification unit 106 in descending order of the similarity, by the inputted distribution number, and may output the information.

Figure 10:
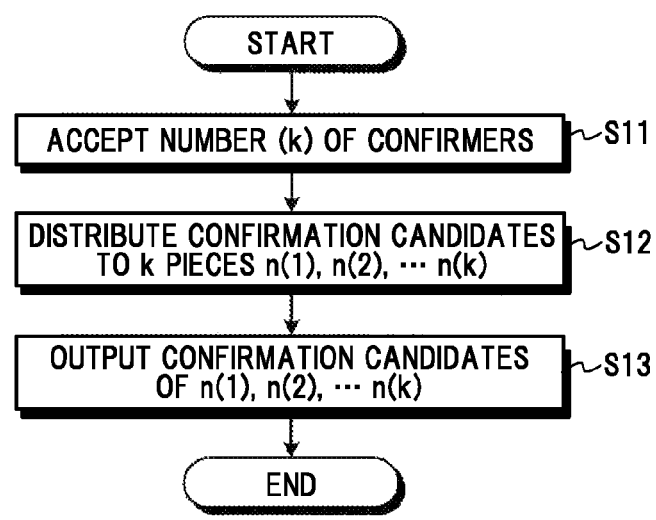
FIG. 10 is a flow chart to exemplify a distribution processing.

FIG. 10 is a flow chart to exemplify a distribution processing. As shown in FIG. 10, the output unit 109 accepts the number of confirmer (k), based on an operation input of an input device such as a keyboard (S11). Next, the output unit 109 distributes the confirmation candidates from the higher rank of the persons extracted by the person identification unit 106 in descending order of the similarity to k pieces (n(1), n(2), . . . , n(k)) (S12). Next, the output unit 109 outputs the distributed n(1), n(2), . . . , n(k) to addresses of the number set to the number of the confirmers (S13). By this means, the confirmation operation distributed by the number of the confirmers (k) can be performed.

This sharing method may be a simple division into k equal parts, or may be configured to distribute the confirmation candidate from the higher rank of the persons extracted by the person identification unit 106 in descending order of the similarity in accordance with a request from a confirmer. For example, the output unit 109 may sequentially output one out of n(1), n(2), . . . , n(k), in accordance with a distribution request from a terminal which a confirmer operates. One out of n(1), n(2), . . . , n(k) is sequentially outputted in accordance with the distribution request, as in this manner, and thereby the distribution can be performed in accordance with the efficiency of the confirmation operation of the confirmer.

Figure 11:
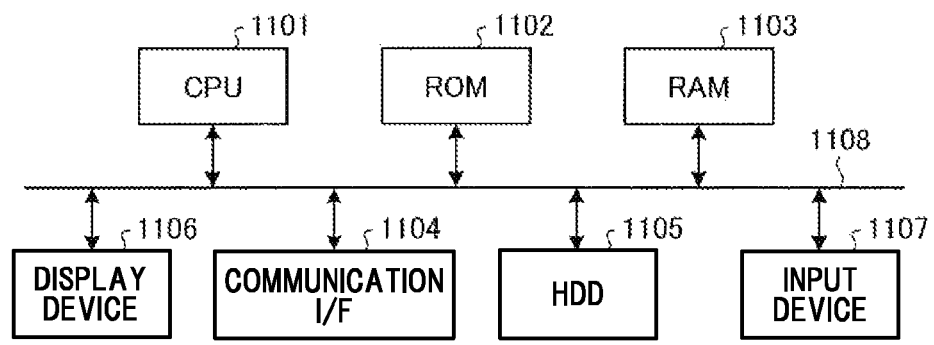
FIG. 11 is a block diagram showing a hardware configuration of the person recognition apparatus.

FIG. 11 is a block diagram showing a hardware configuration of the person recognition apparatus 100. As shown in FIG. 11, the person recognition apparatus 100 is provided with a CPU (Central Processing Unit) 1101, a ROM (Read Only Memory) 1102, a RAM (Random Access Memory) 1102, a communication I/F 1104, an HDD 1105, a display device 1106, an input device 1107 such as a keyboard and a mouse, and a bus 1108 to connect them, and is a hardware configuration using a usual computer. In the person recognition apparatus 100, the CPU develops a program stored in the ROM into the RAM and sequentially executes the program, and thereby realizes the function configuration exemplified in FIG. 1.

Furthermore, the program to be executed in the person recognition apparatus 100 of the present embodiment is presented with being incorporated previously in a ROM and so on. The program to be executed in the person recognition apparatus 100 of the present embodiment may be configured such that the program is presented with being stored in a computer readable recording medium, such as a CD-ROM, a flexible disk (FD), a CD-R, a DVD (Digital Versatile Disk) in a file form of an installable format or an executable format.

Furthermore, the program to be executed in the person recognition apparatus 100 of the present embodiment may be configured such that the program is stored on a computer connected to a network such as Internet, and is presented by being downloaded through the network. In addition, the program to be executed in the person recognition apparatus 100 of the present embodiment may be configured such that the program is provided or distributed through a network such as Internet.

The program to be executed in the person recognition apparatus 100 of the present embodiment is composed of a module configuration including the above-described function configuration, and as an actual hardware, the CPU (Processor) reads out the program from the above-described ROM and executes the program, and thereby the above-described function configuration is loaded on the main storage device, and is generated on the main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A person recognition apparatus, comprising:
an input device to input image data;
a face detection device configured to:
   detect a face area in which a face of a person is expressed from the inputted image data, and to output a score with a large value when a face is detected, and a small value when a face is not detected, based on a brightness value of each pixel of the inputted image;
   detect and output a size of the face in a longitudinal direction and a lateral direction;
   detect and output a yaw direction, a pitch direction, and a roll direction of the face;
a number of candidates calculation device configured to:
   adaptively determine a threshold value relating to a calculation of the number of candidates for each input, based on the value of the detected longitudinal direction, lateral direction, yaw direction, pitch direction, and roll direction of the face;
   display the facial images stored in the feature data administrative device in descending order of the similarity calculated by the person identification device; and
   calculate a number of facial images to be displayed in accordance with the threshold value, the score outputted from the face detection device, and the yaw direction, pitch direction, and roll direction outputted from the facial feature point detection device; and
a candidate confirmation device configured to:
   display retrieval candidates of the facial images in descending order of the similarity and subject said facial images to visual inspection by a user, and
   recalculate the number of the facial images displayed by the number of candidates calculation device in accordance with an increase or decrease of the number of candidates to be confirmed.

2. The apparatus of claim 1, wherein: the second feature amount includes the facial image of the person; and
an output device is configured to display and output a facial image corresponding to the face area detected from the inputted image data, and the facial images of the persons of the number corresponding to the number of candidates from a higher rank of the persons extracted in descending order of the similarity.

3. The apparatus of claim 2, further comprising:
a selection device configured to select a prescribed facial image out of the facial images of the persons of the number corresponding to the number of candidates;
wherein an output device displays and outputs the facial image corresponding to the face area detected from the inputted image data, and the facial image selected by the selection device, side by side.

4. The apparatus of claim 2, wherein: an output device is configured to display and output the facial images of the persons of the number corresponding to the number of candidates in the order of age of the extracted person, side by side.

5. The apparatus of claim 2, wherein: an output device is configured to display and output the facial images of the persons of the number corresponding to the number of candidates in the order of the face direction of the extracted person, side by side.

6. The apparatus of claim 1, further comprising:
an acceptance device configured to accept an input of a distribution number;
wherein an output device is configured to distribute person information of the persons of the number corresponding to the number of candidates from a higher rank of the persons extracted in descending order of the similarity, by the inputted distribution number, and outputs the distributed person information.

7. A person recognition method, comprising:
inputting image data;
detecting a face area in which a face of a person is expressed from the inputted image data, and outputting a score with a large value when a face is detected, and a small value when a face is not detected, based on a brightness value of each pixel of the inputted image;
detecting and outputting a size of the face in a longitudinal direction and a lateral direction;
detecting and outputting a yaw direction, a pitch direction, and a roll direction of the face;
adaptively determine a threshold value relating to a calculation of the number of candidates for each input, based on the value of the detected longitudinal direction, lateral direction, yaw direction, pitch direction, and roll direction of the face;
displaying the facial images stored in the feature data administrative device in descending order of the calculated similarity, and calculating a number of facial images to be displayed in accordance with the threshold value, the outputted score, and the outputted yaw direction, pitch direction, and roll direction of the face;
subjecting to visual inspection by a user retrieval candidates of the facial images displayed in descending order of the similarity, and recalculating the number of the facial images to be displayed in accordance with increase or decrease of the number of candidates to be confirmed.

* * * * *